1

3,395,164
NOVEL ORGANOTIN SILICATES
John R. Leebrick, Lyme, Conn., assignor to Chas. Pfizer & Co., Inc., New York, N.Y., a corporation of Delaware
No Drawing. Filed June 29, 1965, Ser. No. 468,157
5 Claims. (Cl. 260—429.7)

ABSTRACT OF THE DISCLOSURE

Novel organotin silicate esters containing sulfur useful in the stabilization of plastics.

This invention relates to new organometallic compounds. More particularly, is is concerned with novel organotin silicate esters which have been found to efficiently stabilize plastic compositions against the deteriorative effects of heat and light, and a method of preparing said esters.

The new compounds contemplated by the instant invention are selected from the group consisting of those of the formula:

$$[R_nSn(S-R'-O)_{4-n}]_m[SiR''_r]_p$$

and

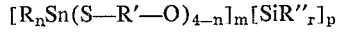

wherein $n$ is an integer of from 1 to 3; $m$ is an integer of from 1 to 4; $r$ is an integer of from 0 to 3; and $p$, using the preselected values for $n$, $m$ and $r$, is an integer within the range from $$\frac{m(4-n)}{4-r} \text{ to } m(4-n)$$

R" is selected from the group consisting of $R^4$ and $OR^4$;
$R^4$ and R are each hydrocarbon substituents selected from the group consisting of alkyl, alkenyl, alkynyl, cycloalkyl, cycloalkenyl, mono- and bicyclic-aryl and alkaryl of up to 18 carbon atoms and R' and R''' are each divalent radicals selected from the group consisting of alkylene, alkenylene, alkynylene, cycloalkylene, cloalkylene, mono- and bicyclic-arylene and alkarylene of up to 18 carbon atoms.

Particularly effective compounds of this invention are those in which $n$ is 2, R is alkyl containing up to 18 carbon atoms and R' is alkylene containing up to 18 carbon atoms. Representative examples of such compounds which are highly effective as stabilizers for polyvinyl chloride resins are the following:

$$[(CH_3(CH_2)_2CH_2)_2Sn(S-CH_2CH_2-O)_2]_2Si$$

and

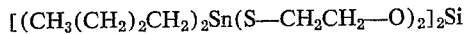

The process of preparing the compounds of this invention consists of heating, at transesterification temperature, a hydroxyorganotin compound of the formula:

$$R_nSn(S-R'-OH)_{4-n}$$

or of the formula:

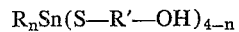

wherein $n$, R, R' and R''' are as herein above designated, with a silicon compound of the formula:

$$(R^4O)_{4-r}SiR^4_r$$

wherein $r$ and $R^4$ are as indicated above, until an organotin silicate ester substantially free of hydroxyl substituents is obtained.

The hydroxyorganotin compounds, i.e., starting materials, may be prepared by techniques familiar to those skilled in the art. For example, the following sequence can be used:

$$RSnOOH + 3HSR'OH \xrightarrow{(1)}_{\Delta} RSn(SR'OH)_3 + 2H_2O$$

$$R_2SnO + 2HSR'OH \xrightarrow{(2)}_{\Delta} R_2Sn(SR'OH)_2 + H_2O$$

$$(R_3Sn)_2O + 2HSR'OH \xrightarrow{(3)}_{\Delta} 2R_3SnSR'OH + H_2O$$

wherein R, R' and $n$ are as hereinabove designated.
Similarly, the hydroxyorganotin compounds containing the group

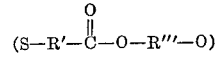

can be prepared by this sequence if, instead of using a mercapto alcohol in sequences (1), (2) and (3), there is used a hydroxyester of a mercaptocarboxylic acid or an obvious chemical equivalent thereof. Since in the case of reactions (1), (2) and (3) water is the by-product, a convenient reaction temperature is about 120° C.

The starting materials for these sequences are readily available or can be easily prepared by techniques familiar to those skilled in the art. Illustrative of the commercially available tin-containing starting materials are bis-tributyltin oxide, dibutyltin oxide and butylstannoic acid. Generally, to prepare starting materials with varying R groups, it is convenient to use a modification of the classical Grignard technique; leading references for this are cited in H. V. Smith "Organotin Stabilizers," Tin Research Institute, Middlesex, England, page 5, (1959). Illustrative of the R groups contemplated by the instant invention are methyl, n-butyl, isobutyl, n-octyl, phenyl, benzyl, ortho-tolyl, cyclopentadienyl, octadecyl, 2-ethylhexyl, ethynyl, cyclohexyl, cyclohexenyl, and the like.

The mercapto alcohols used as starting materials are available commercially or can be prepared readily. Especially useful in preparing the instant compounds are mercaptoalcohols of the formula HS—R'—OH wherein R' is methylene, ethylene, hexylene, octadecylene, hexadecylethylene, 2-butynylene, cyclohexylene, cyclohexenylene, phenylene, tolylene, naphthylene, and the like. Of course, as will be obvious to one skilled in the art, the above formula for the mercaptoalcohol does not intend to encompass compounds wherein the terminal —OH or —SH substituents are bonded directly to an unsaturated carbon atom in those instances when R' and R''' are alkylene, alkynylene or cycloalkenylene.

The hydroxyesters of mercaptocarboxylic acids used as starting materials are freely available commercially or can be readily prepared. For example, thioglycollic acid can be esterified with ethylene glycol to provide beta-hydroxyethyl thioglycollate. Illustrative of other esters useful to prepare the new compounds are those of the formula

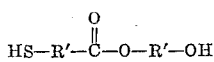

wherein the substituents R' are each valued as designated hereinabove.

The hydroxyorganotin compounds prepared by sequences (1), (2) and (3) hereinbefore described can be satisfactorily encompassed by the general formulae:

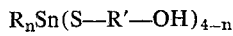

and

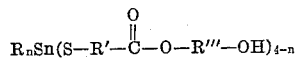

wherein R, R', R''' and $n$ are as defined earlier.

To prepare the novel products of this invention, the aforementioned hydroxyorganotin compounds are reacted with a silicon compound of the formula:

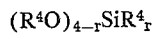

wherein $r$ is an integer of from 0 to 3; and $R^4$ is as defined earlier.

The basis of this reaction with regard to stoichiometry consists of adding at least a sufficient amount of said silicon compound to react with all free hydroxyl groups in said tin compound.

A preferred embodiment of the aforesaid reaction concerns the alkoxy moiety of the silicon compound. It is desirable to carry out said reaction wherein $R^4$ associated with the alkoxy moiety is alkyl containing up to about 8 carbon atoms. In so doing, the reaction temperatures sufficient to drive off the resulting by-product, i.e., corresponding alcohols containing up to 8 carbon atoms, range from about 140° C. to about 180° C. It is, of course, possible to have said $R^4$ group contain up to 18 carbon atoms; however, it is evident that higher reaction temperatures will be required to drive out the corresponding higher molecular weight alcohols from the reaction mixture.

As will be apparent, these new compounds are polymeric in most cases. This arises from the polyfunctional nature of both the organotin and the silicate ester portions of the starting materials. The polymeric nature is suggested in some instances by the observation that some of the products are viscous, or are glassy or even solid at room temperature.

Plastic compositions stabilized by the compounds of the instant invention may be prepared by incorporating them separately, or in admixture, into vinyl resins, which may contain plasticizers, fillers, pigments, dyes, ultraviolet absorbing agents, densifying agents, and other additives in addition to the resins, by admixing in an appropriate mill or mixer or by any of the well known methods which provide for uniform distribution through the plastic compositions.

The new compounds may be advantageously employed in concentrations of as little as about 0.01% by weight of the resin or as much as about 10%. Ordinarily, however, concentrations of from about 0.01% to about 5% are preferred for reasons of economy, greater concentrations providing relatively little additional benefit.

The vinyl resins effectively stabilized by the new compounds include those containing a plurality of vinyl chloride units such as polymers of vinyl chloride and conjoint polymers of vinyl chloride with another polymerizable compound, illustrative of which are esters of acrylic and methacrylic acid, acrylonitrile, vinyl acetate, diethyl maleate, vinylidene chloride, acrolein, methyl vinyl ketone, methyl vinyl ether, and the like. Also stabilized are polymers of chlorinated styrene, chlorinated rubber, chlorinated polymers of ethylene, chlorinated rubber hydrochloride, and mixtures of the polymers recited herein and their corresponding bromides and fluorides.

The novel compounds disclosed in the instant invention may also find utility as antimicrobial agents for use in paints and films, and especially in marine coatings which are particularly susceptible to the deteriorative effects of organisms.

The following examples are illustrative of the compounds of this invention. They are not to be construed as limiting the scope thereof in any manner whatsoever.

EXAMPLE I

A plastic stabilizer of the following formula:

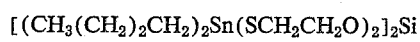

is prepared by heating 24.9 g., 0.1 mole, of dibutyltin oxide and 15.6 g., 0.2 mole, of beta-mercaptoethanol at 120° C. for 4 hours; then adding to 11.61 g., 0.03 mole, of the dibutyltin bis-hydroxyethylmercaptide thus formed, 3.12 g., 0.015 mole, of tetraethylorthosilicate and heating the mixture slowly, with thorough stirring, to 140° C. during 3 hours. The clear solution, after cooling to room temperature provides a clear, glassy product, which is an effective stabilizer for vinyl chloride polymers.

EXAMPLE II

A plastic stabilizer of the following formula:

$$[(CH_3(CH_2)_2CH_2)_2Sn(S-CH_2-\overset{\overset{O}{\|}}{C}-O-CH_2CH_2-O)_2]_2Si$$

is prepared by heating 24.9 g., 0.1 mole, of dibutyltin oxide and 27.2 g., 0.2 mole, of beta-hydroxyethyl thioglycollate at 120° C. for 4 hours; then adding to 15.09 g., 0.03 mole, of the dibutyltin bis-beta-hydroxyethyl thioglycollate thus formed, 3.12 g., 0.15 mole, of tetraethyl orthosilicate and heating the mixture slowly, with stirring, to 140° C. during 3 hours. After cooling, there is obtained a clear product, which is an effective vinyl stabilizer.

EXAMPLE III

A plastic stabilizer of the following formula:

$$[n\text{-}BuSn(SCH_2CH_2-O)_3]_4Si_3$$

is prepared by heating butylstannoic acid (0.1 M) and β-mercaptoethanol (0.2 M) at 120° C. for 4 hours; then adding to 0.04 M of the resulting product, tetraethylorthosilicate (0.03 M) and heating the mixture slowly, with thorough stirring, to 140° C. for 3 hours. After cooling, there is obtained a clear product, which is an effective vinyl stabilizer.

EXAMPLE IV

A plastic stabilizer of the following formula:

$$[n\text{-}Bu_3SnS-CH_2-O]_4Si$$

is prepared by heating tributyltin oxide (0.1 M) and β-mercaptoethanol (0.2 M) at 120° C. for 4 hours; then adding to 0.04 M of the resulting product, tetraethylorthosilicate (0.01 M) and heating the mixture slowly, with thorough stirring, to 140° C. for 3 hours. After cooling, there is obtained a clear product, which is an effective vinyl stabilizer.

EXAMPLE V

A plastic stabilizer of the following formula:

$$[n\text{-}Bu_2Sn(SCH_2CH_2O)_2]_3[SiOEt]_2$$

is prepared by heating dibutyltin oxide (0.1 M) and β-mercaptoethanol (0.2 M) at 120° C. for 4 hours; then adding to 0.03 M of the resulting product, tetraethylorthosilicate (0.02 M) and heating the mixture slowly, with thorough stirring, to 140° C. for 3 hours. After cooling, there is obtained a clear product, which is an effective vinyl stabilizer.

EXAMPLE VI

Compounds of the following general formula are prepared by the procedure of Example I:

$$[R_nSn(SR'-O)_{4-n}]_m[SiR^4_qOR^4_s]_p$$

wherein $m$, $n$, $p$, $R$, $R'$ and $R^4$ are as defined earlier, and $q$ and $s$ are integers whose sum total is equal to $r$, i.e. $q+s=r$.

| m | p | n | R | R' | q | R⁴ | s | ER⁴ |
|---|---|---|---|----|---|----|---|-----|
| 3 | 2 | 2 | n-C₄H₉— | —CH₂—CH₂— | 1 | n-C₄H₉— | 0 | |
| 1 | 2 | 2 | n-C₄H₉— | —CH₂—CH₂— | 1 | n-C₄H₉— | 2 | —OC₂H₅ |
| 1 | 1 | 1 | n-C₄H₉— | —CH₂—CH₂— | 0 |  | 1 | —OC₁₂H₂₅ |
| 2 | 3 | 1 | n-C₄H₉— | —CH₂—CH₂— | 1 | n-C₄H₉— | 1 | —OC₁₈H₃₇ |
| 1 | 3 | 1 | n-C₄H₉— | —CH₂—CH₂— | 2 | n-C₄H₉— | 1 | —OC₂H₅ |
| 3 | 1 | 3 | n-C₄H₉— | —CH₂—CH₂— | 0 |  | 1 | —OCH₃ |
| 2 | 1 | 3 | n-C₄H₉— | —CH₂—CH₂— | 2 | n-C₄H₉— | 0 | |
| 1 | 1 | 3 | n-C₄H₉— | —CH₂—CH₂— | 2 | n-C₄H₉— | 1 | —O—CH₂—CH=CH₂ |
| 1 | 1 | 2 | CH₃— | —CH₂—CH₂— | 1 | CH₃— | 1 | —OC₂H₅ |
| 1 | 1 | 2 | C₆H₅— | —CH₂—CH₂— | 0 |  | 2 | —OC₂H₅ |
| 1 | 1 | 2 | C₆H₅—CH₂— | —CH₂—CH₂— | 2 | C₆H₅—CH₂— | 0 | |
| 1 | 1 | 2 | (CH₃)C₆H₄— | —CH₂—CH₂— | 1 | (CH₃)C₆H₄— | 1 | —OC₂H₅ |
| 1 | 1 | 2 | cyclopentyl— | —CH₂—CH₂— | 1 | cyclopentyl— | 1 | —OC₃H₇ |
| 1 | 1 | 2 | CH₃(CH₂)₁₆CH₂— | —CH₂—CH₂— | 0 |  | 2 | —OC₂H₅ |
| 3 | 1 | 3 | CH₃(CH₂)₃CH(C₂H₅)CH₂— | —CH₂—CH₂— | 1 | CH₃(CH₂)₃CH(C₂H₅)CH₂— | 0 | |
| 1 | 3 | 1 | HC≡C— | —CH₂—BH₂— | 2 | HC≡C— | 1 | —OC₂H₅ |
| 1 | 2 | 2 | cyclohexyl— | —CH₂—CH₂— | 3 | cyclohexyl— | 0 | |
| 1 | 1 | 2 | methylcyclohexyl— | —CH₂—CH₂— | 1 | methylcyclohexyl— | 1 | —OC₃H₇ |

| m | p | n | R | R' | q | R⁴ | s | OR⁴ |
|---|---|---|---|---|---|---|---|---|
| 1 | 1 | 2 | CH₃(CH₂)₂CH₂— | —CH₂— | 2 | CH₃(CH₂)₂CH₂— | 0 | |
| 1 | 1 | 2 | CH₃(CH₂)₂CH₂— | —CH₂(CH₂)₂CH₂— | 0 | | 2 | —OC₂H₅ |
| 1 | 1 | 2 | CH₃(CH₂)₂CH₂— | —CH₂(CH₂)₁₆CH₂— | 1 | CH₃(CH₂)₂CH₂— | 1 | —OC₂H₅ |
| 1 | 1 | 2 | CH₃(CH₂)₂CH₂— | —CH[CH₂(CH₂)₁₄CH₃]CH₂— | 1 | CH₃(CH₂)₂CH₂— | 1 | —OC₂H₅ |
| 1 | 1 | 2 | CH₃(BH₂)₂CH₂— | —CH₂—CH=CH—CH₂— | 0 | | 2 | —OC₂H₅ |
| 1 | 1 | 2 | CH₃(CH₂)₂CH₂— | —CH₂—C(CH₃)=CH—CH₂— | 2 | CH₃(CH₂)₂CH₂— | 0 | |
| 1 | 1 | 2 | CH₃(CH₂)₂CH₂— | —CH₂—C≡C—CH₂— | 1 | CH₃(CH₂)₂CH₂— | 1 | —OC₂H₅ |
| 1 | 1 | 2 | CH₃(CH₂)₂CH₂— | —CH₂—C≡CH₂— | 1 | CH₃(CH₂)₂CH₂— | 1 | —OC₃H₇ |
| 2 | 1 | 2 | CH₃(CH₂)₂CH₂— | —CH(CH₂CH₂)(CH₂CH₂)CH— (cyclohexylene) | 0 | | 0 | |
| 2 | 1 | 2 | CH₃(CH₂)₂CH₂— | —CH(CH=CH)(CH₂CH₂)CH— (cyclohexenylene) | 0 | | 0 | |
| 2 | 1 | 2 | CH₂(CH₂)₂CH₂— | —C₆H₄— | 0 | | 0 | |
| 2 | 1 | 2 | CH₃(CH₂)₂CH₂— | —C₆H₃(CH₃)— | 0 | | 0 | |
| 1 | 1 | 1 | CH₃(CH₂)₂CH₂— | —naphthylene— | 0 | | 1 | —OC₂H₅ |
| 1 | 1 | 1 | CH₃(CH₂)₂CH₂— | —CH₂—CH₂— | 0 | | 1 | —OCH₃ |
| 1 | 1 | 1 | CH₃(CH₂)₂CH₂— | —CH₂—CH₂— | 0 | | 1 | —OCH₃ |
| 3 | 1 | 3 | CH₃(CH₂)₂CH₂— | —CH₂—CH₂— | 0 | | 1 | C₆H₅—O— |
| 3 | 1 | 3 | CH₃(CH₂)₂CH₂— | —CH₂—CH₂— | 0 | | 1 | C₆H₅—O— |
| 3 | 1 | 3 | CH₃(CH₂)₂CH₂— | —CH₂—CH₂— | 0 | | 1 | C₆H₅—CH₂O— |
| 1 | 2 | 2 | CH₃(CH₂)₂CH₂— | —CH₂—CH₂— | 2 | CH₃(CH₂)₂CH₂— | 1 | C₆H₅—CH₂O— |
| 1 | 1 | 3 | CH₃(CH₂)₂CH₂— | —CH₂—CH₂— | 2 | CH₃(CH₂)₂CH₂— | 1 | CH₃C₆H₄—O— |
| 1 | 1 | 3 | CH₃(CH₂)₂CH₂— | —CH₂—CH₂— | 2 | CH₃(CH₂)₂CH₂— | 1 | CH₃C₆H₄—O— |
| 1 | 2 | 2 | CH₃(CH₂)₂CH₂— | —CH₂—CH₂— | 2 | CH₃(CH₂)₂CH₂— | 1 | cyclopentenyl—O— |
| 1 | 1 | 3 | CH₃(CH₂)₂CH₂— | —H₂—CH₂— | 2 | CH₃(CH₂)₂CH₂— | 1 | cyclopentenyl—O— |
| 1 | 1 | 3 | CH₃(CH₂)₂CH₂— | —CH₂—CH₂— | 1 | CH₃(CH₂)₂CH₂— | 2 | CH₃(CH₂)₁₆CH₂O— |
| 1 | 1 | 3 | CH₃(CH₂)₂CH₂— | —CH₂—CH₂— | 1 | CH₃(CH₂)₂CH₂— | 2 | CH₃(CH₂)₁₆CH₂O— |
| 1 | 1 | 2 | CH₃(CH₂)₂CH₂— | —CH₂—CH₂— | 1 | CH₃(CH₂)₂CH₂— | 1 | HC≡C—CH₂O— |
| 1 | 1 | 2 | CH₃(CH₂)₂CH₂— | —CH₂—CH₂— | 1 | CH₃(CH₂)₂CH₂— | 1 | cyclohexyl-CHO— |
| 3 | 1 | 3 | CH₃(CH₂)₂CH₂— | —CH₂—CH₂— | 0 | | 1 | cyclohexenyl-CHO— |

EXAMPLE VII

Compounds of the following general formula are prepared by the procedure of Example II:

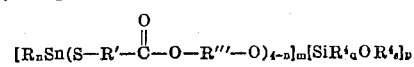

$[R_nSn(S—R'—\overset{O}{\overset{\|}{C}}—O—R'''—O)_{4-n}]_m[SiR^4{}_qOR^4{}_s]_p$ wherein $m$, $n$, $p$, R, R', R''' and $R^4$ are as defined earlier, and $q$ and $s$ are integers whose sum total is equal to $r$, i.e. $q+s=r$.

| m | p | n | R | R' | R'' | q | R⁴ | s | OR⁴ |
|---|---|---|---|---|---|---|---|---|---|
| 3 | 1 | 3 | CH₃(CH₂)₂CH₂— | —CH₂— | —CH₂(CH₂)₂CH₂— | 0 | | 1 | —OC₂H₅ |
| 3 | 2 | 2 | CH₃(CH₂)₂CH₂— | —CH₂— | —CH₂(CH₂)₁₀CH₂— | 0 | | 1 | —OC₂H₅ |
| 3 | 2 | 2 | CH₃(CH₂)₂CH₂— | —CH₂— | —CH[CH₂(CH₂)₁₄CH₃]CH₂— | 0 | | 1 | —OC₂H₅ |
| 3 | 2 | 2 | CH₃(CH₂)₂CH₂— | —CH₂— | —CH₂—CH=CH—CH₂— | 0 | | 1 | —OC₂H₅ |
| 1 | 2 | 3 | CH₃(CH₂)₂CH₂— | —CH₂— | —CH₂—C(CH₃)=CH—CH₂— | 0 | | 2 | —OC₂H₅ |
| 2 | 1 | 2 | CH₃(CH₂)₂CH₂— | —CH₂— | —CH₂—CH—CH₂— | 0 | | 2 | —OC₂H₅ |
| 2 | 1 | 3 | CH₃(CH₂)₂CH₂— | —CH₂— | —CH₂C≡C—CH₂— | 0 | | 2 | —OC₂H₅ |
| 2 | 3 | 1 | CH₃(CH₂)₂CH₂— | —CH₂— | [cyclohexane-CH₂ ring structure] | 0 | | 2 | —OC₁₈H₃₇ |
| 2 | 3 | 1 | CH₃(CH₂)₂CH₂— | —CH₂— | [cyclohexene-CH₂ ring structure] | 0 | | 2 | —OC₁₂H₂₅ |
| 1 | 1 | 3 | CH₃(CH₂)₂CH₂— | —CH₂— | [phenyl with CH₃] | 1 | CH₃(CH₂)₂CH₂— | 2 | —OC₂H₅ |
| 1 | 1 | 3 | CH₃(CH₂)₂CH₂— | —CH₂— | [p-phenyl] | 1 | CH₃(CH₂)₂CH₂— | 2 | —OC₂H₅ |
| 1 | 3 | 1 | CH₃(CH₂)₂CH₂— | —CH₂— | [naphthyl] | 0 | | 3 | —OC₂H₅ |
| 1 | 3 | 1 | CH₃— | —CH₂— | —CH₂CH₂— | 2 | CH₃ | 1 | —OC₆H₁₃ |
| 2 | 3 | 1 | [phenyl-CH₂] | —CH₂— | —CH₂CH₂— | 2 | [phenyl-CH₂] | 0 | |
| 1 | 1 | 2 | [phenyl-CH₂ with CH₃] | —CH₂— | —CH₂CH₂— | 1 | [phenyl-CH₂ with CH₃] | 1 | —OC₂H₅ |
| 1 | 3 | 1 | [biphenyl-CH₂] | —CH₂— | —CH₂CH₂— | 1 | [diphenylmethyl] | 1 | —OC₂H₅ |
| 2 | 1 | 2 | [cyclopentadiene-CH₂] | —CH₂— | —CH₂CH₂— | 0 | | 2 | —OC₂H₅ |
| 1 | 1 | 2 | CH₃(CH₂)₁₆CH₂— | —CH₂— | —CH₂CH₂— | 1 | CH₃(CH₂)₁₆CH₂— | 1 | —OC₂H₅ |
| 3 | 1 | 3 | CH₃(CH₂)₃CH(C₂H₅)CH₂— | —CH₂— | —CH₂CH₂— | 1 | CH₃(CH₂)₃CH(C₂H₅)CH₂— | 0 | —OC₂H₅ |
| 1 | 3 | 1 | HO=C— | —CH₂— | —CH₂CH₂— | 2 | HO=C— | 1 | —OC₂H₅ |
| 2 | 1 | 3 | [cyclohexane with CH₂—CH₂] | —CH₂— | —CH₂CH₂— | 1 | [cyclohexane with CH₂—CH₂] | 1 | —OC₂H₅ |
| 2 | 1 | 3 | [cyclohexene with CH=CH] | —CH₂— | —CH₂CH₂— | 1 | [cyclohexene with CH=CH] | 1 | —OC₂H₅ |

| m | p | n | R | R' | R'' | q | R⁴ | s | OR⁴ |
|---|---|---|---|---|---|---|---|---|---|
| 1 | 1 | 3 | CH₃(CH₂)₂CH₂— | —CH₂CH₂— | —CH₂CH₂— | 2 | CH₃(CH₂)₂CH₂— | 1 | —OC₃H₇ |
| 1 | 1 | 3 | CH₃(CH₂)₂CH₂— | —CH₃(CH₂)₂CH₂— | —CH₂CH₂— | 2 | CH₃(CH₂)₂CH₂— | 1 | —OC₂H₅ |
| 1 | 1 | 2 | CH₃(CH₂)₃CH₂— | —CH₃(CH₂)₂CH₂— | —CH₂CH₂— | 3 | CH₃(CH₂)₂CH₂— | 0 | —OC₂H₅ |
| 1 | 2 | 2 | CH₃(CH₂)₅CH₂— | —CH₃(CH₂)₁₀CH₃— | —CH₂CH₂— | 1 | CH₃(CH₂)₂CH₂— | 1 | —OC₂H₅ |
| 2 | 1 | 2 | CH₃(CH₂)₂CH₂— | —CH(OH)₂=(OH₃)CH₃— | —CH₂CH₂— | 1 | CH₃(CH₂)₂CH₂— | 2 | —OC₂H₅ |
| 2 | 1 | 2 | CH₃(CH₂)₂CH₂— | —CH₂—CH=CH—CH₂— | —CH₂CH₂— | 0 | CH₃(CH₂)₂CH₂— | 1 | —OC₂H₅ |
| 2 | 2 | 2 | CH₃(CH₂)₂CH₂— | —CH₂—C=C—CH₂— | —CH₂CH₂— | 1 | CH₃(CH₂)₂CH₂— | 2 | —OC₂H₅ |
| 2 | 3 | 1 | CH₃(CH₂)₂CH₂— | —CH₂—C=C—CH₂— | —CH₂CH₂— | 1 | CH₃(CH₂)₂CH₂— | 1 | —OC₂H₅ |
| 1 | 1 | 1 | CH₃(CH₂)₂CH₂— | cyclohexyl-diol | —CH₂CH₂— | 0 | CH₃(CH₂)₂CH₃ | 1 | —OC₂H₅ |
| 1 | 1 | 1 | CH₃(CH₂)₂CH₂— | cyclohexenyl-diol | —CH₂CH₂— | 1 | CH₃(CH₂)₂CH₃ | 0 | |
| 1 | 1 | 1 | CH₃(CH₂)₂CH₂— | phenylene | —CH₂CH₂— | 1 | CH₃(CH₂)₂CH₃ | 0 | |
| 3 | 1 | 2 | CH₃(CH₂)₂CH₂— | methylphenylene | —CH₂CH₂— | 1 | CH₃(CH₂)₂CH₃ | 0 | —OC₂H₅ |
| 1 | 1 | 3 | CH₃(CH₂)₂CH₂— | naphthylene | —CH₂CH₂— | 1 | CH₃(CH₂)₂CH₃ | 2 | —OC₂H₅ |
| 1 | 1 | 3 | CH₃(CH₂)₂CH₂— | —CH₃ | —CH₂CH₂— | 3 | CH₃(CH₂)₂CH₃ | 0 | |
| 1 | 3 | 1 | CH₃(CH₂)₂CH₂— | —CH₃ | —CH₂CH₂— | 0 | | 0 | |
| 1 | 3 | 1 | CH₃(CH₂)₃CH₂— | —CH₃ | —CH₂CH₂— | 0 | | 0 | |
| 4 | 1 | 1 | CH₃(CH₂)₂CH₂— | —CH₃ | —CH₂CH₂— | 0 | | 0 | |
| 4 | 1 | 3 | CH₃(CH₂)₂CH₂— | —CH₃ | —CH₂CH₂— | 0 | | 0 | |
| 2 | 2 | 2 | CH₃(CH₂)₂CH₂— | —CH₃ | —CH₂CH₂— | 0 | | 0 | |
| 2 | 2 | 2 | CH₃(CH₂)₂CH₂— | —CH₃ | —CH₂CH₂— | 0 | | 0 | |
| 2 | 2 | 2 | CH₃(CH₂)₂CH₂— | —CH₃ | —CH₂CH₂— | 0 | | 0 | |
| 1 | 1 | 3 | CH₃(CH₂)₂CH₂— | —CH₃ | —CH₂CH₂— | 2 | CH₃(CH₂)₂CH₃ | 1 | methoxyphenyl |
| 1 | 1 | 3 | CH₃(CH₂)₂CH₂— | —CH₂ | —CH₂CH₂— | 2 | CH₃(CH₂)₂CH₃ | 1 | methoxycyclohexenyl |
| 1 | 1 | 3 | CH₃(CH₂)₂CH₂— | —CH₂ | —CH₂(CH₂)₁₀CH₂— | 0 | CH₃(CH₂)₂CH₃ | 1 | methoxycyclohexyl |
| 3 | 1 | 3 | CH₃(CH₂)₂CH₂— | —CH₃ | —CH₂CH₂— | 0 | CH₃(CH₂)₁₀CH₂ | 1 | CH₃(CH₂)₁₆CH₂O— |
| 2 | 3 | 1 | CH₃(CH₂)₂CH₂— | —CH₃ | —CH₂CH₂— | 1 | CH₃(CH₂)₁₀CH₂ | 1 | CH₃(CH₂)₁₆CH₂O— |
| 2 | 3 | 1 | CH₃(CH₂)₂CH₂— | —CH₃ | —CH₂CH₂— | 1 | CH₃(CH₂)₁₀CH₂ | 1 | HC≡C—O— |
| 3 | 1 | 1 | CH₃(CH₂)₂CH₂— | —CH₃ | —CH₂CH₂— | 2 | CH₃(CH₂)₂CH₃ | 1 | glyceryl |
| 4 | 3 | 1 | CH₃(CH₂)₂CH₂— | —CH₃ | —CH₂CH₂— | 0 | CH₃(CH₂)₂CH₃ | 0 | —OC₂H₅ |
| 1 | 2 | 2 | CH₃(CH₂)₂CH₂— | —CH₃ | —CH₂CH₂— | 1 | CH₃(CH₂)₂CH₃ | 2 | |
| 3 | 1 | 3 | CH₃(CH₂)₂CH₂— | —CH₃ | —CH₂CH₂— | 1 | CH₃(CH₂)₂CH₃ | 0 | |

EXAMPLE VIII

The compound prepared by the procedure of Example I was evaluated as a stabilizer in the following manner: said compound was incorporated into a mixture of 20 parts of a plastisol grade PVC and 80 parts of dioctylphthalate at a level of 2% based on resin by thorough agitation at room temperature. Aliquots of the resulting plastisol formulation were placed in small test tubes and heated at 180° C. At fifteen minute intervals, a tube was removed and the color development in the plastisol (indicating degradation of the resin) was compared with that from a similar experiment using a commercial organotin-mercaptide stabilizer. The color was assigned a numerical rating based on a scale in which 7.0 equals no color development and 0.0 equals maximum color development (maximum degradation). The results shown below clearly indicate the effectiveness of this stabilizer.

|  | 15 min. | 30 min. | 45 min. | 60 min. | 75 min. | 90 min. |
|---|---|---|---|---|---|---|
| $[(CH_3(CH_2)_2CH_2)_2Sn(SCH_2CH_2O)_2]_2Si$ | 7.0 | 6.8 | 6.5 | 6.0 | 5.8 | 5.5 |
| Commercial stabilizer | 6.5 | 5.8 | 5.3 | 4.8 | 3.8 | 3.5 |

EXAMPLE IX

The method of Example VIII is repeated wherein the compounds of Examples II, III, IV, V, VI and VII are evaluated and substantially the same results are obtained.

What is claimed is:

1. A compound selected from the group consisting of those of the formulae:

and $$[R_nSn(S-R'-O)_{4-n}]_m[SiR''_r]_p$$

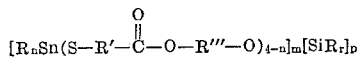

wherein $n$ is an integer of from 1 to 3; $m$ is an integer of from 1 to 4; $r$ is an integer of from 0 to 3; and $p$, using the preselected values for $n$, $m$ and $r$, is an integer within the range from $$\frac{m(4-n)}{4-r} \text{ to } m(4-n)$$

R'' is selected from the group consisting of $R^4$ and $OR^4$;
$R^4$ and R are each hydrocarbon substituents selected from the group consisting of alkyl, alkenyl, alkynyl, cycloalkyl, cycloalkenyl, mono- and bicyclic-aryl and alkaryl of up to 18 carbon atoms and
R' and R''' are each divalent radicals selected from the group consisting of alkylene, alkenylene, alkynylene, cycloalkylene, cycloalkenylene, mono- and bicyclic-arylene and alkarylene of up to 18 carbon atoms.

2. A compound of the formula:

$$[R_nSn(S-R'-O)_{4-n}]_m[SiR''_r]_p$$

wherein $n$ is an integer of from 1 to 3; $m$ is an integer of from 1 to 4; $r$ is an integer of from 0 to 3; and $p$, using the preselected values for $n$, $m$ and $r$, is an integer within the range from $$\frac{m(4-n)}{4-r} \text{ to } m(4-n)$$

R'' is selected from the group consisting of $R^4$ and $OR^4$;
$R^4$ and R are each hydrocarbon substituents selected from the group consisting of alkyl, alkenyl, alkynyl, cycloalkyl, cycloalkenyl, mono- and bicyclic-aryl and alkaryl of up to 18 carbon atoms and
R' is a divalent radical selected from the group consisting of alkylene, alkenylene, alkynylene, cycloalkylene, cycloalkenylene, mono- and bicyclic-arylene and alkarylene of up to 18 carbon atoms.

3. A compound of the formula:

$$[(CH_3(CH_2)_2CH_2)_2Sn(S-CH_2CH_2-O)_2]_2Si$$

4. A compound of the formula:

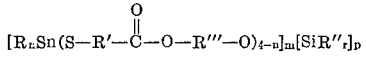

wherein $n$ is an integer of from 1 to 3; $m$ is an integer of from 1 to 4; $r$ is an integer of from 0 to 3; and $p$, using the preselected values for $n$, $m$ and $r$, is an integer within the range from $$\frac{m(4-n)}{4-r} \text{ to } m(4-n)$$

R'' is selected from the group consisting of $R^4$ and $OR^4$;
$R^4$ and R are each hydrocarbon substituents selected from the group consisting of alkyl, alkenyl, alkynyl, cycloalkyl, cycloalkenyl, mono- and bicyclic-aryl and alkaryl of up to 18 carbon atoms and
R' and R''' are each divalent radicals selected from the group consisting of alkylene, alkenylene, alkynylene, cycloalkylene, cycloalkenylene, mono- and bicyclic-arylene and alkarylene of up to 18 carbon atoms.

5. A compound of the formula:

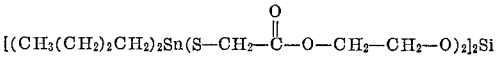

References Cited

UNITED STATES PATENTS

| 2,630,446 | 3/1953 | Gresham | 260—448.8 |
| 2,885,415 | 5/1959 | Ramsden | 260—429.7 |

TOBIAS E. LEVOW, *Primary Examiner.*

W. F. W. BELLAMY, *Assistant Examiner.*